United States Patent
Kim et al.

(10) Patent No.: US 10,432,508 B2
(45) Date of Patent: Oct. 1, 2019

(54) METHOD AND DEVICE FOR MESSAGE FLOODING IN WIRELESS COMMUNICATION SYSTEM

(71) Applicants: LG ELECTRONICS INC., Seoul (KR); SNU R&DB FOUNDATION, Seoul (KR)

(72) Inventors: Hakseong Kim, Seoul (KR); Daeho Kang, Seoul (KR); Saewoong Bahk, Seoul (KR)

(73) Assignees: LG ELECTRONICS INC., Seoul (KR); SNU R&DB FOUNDATION, Seoul (KR)

( * ) Notice: Subject to any disclaimer, the term of this patent is extended or adjusted under 35 U.S.C. 154(b) by 202 days.

(21) Appl. No.: 15/329,528

(22) PCT Filed: Jul. 29, 2015

(86) PCT No.: PCT/KR2015/007907
§ 371 (c)(1),
(2) Date: Jan. 26, 2017

(87) PCT Pub. No.: WO2016/018060
PCT Pub. Date: Feb. 4, 2016

(65) Prior Publication Data
US 2017/0214607 A1    Jul. 27, 2017

Related U.S. Application Data

(60) Provisional application No. 62/031,142, filed on Jul. 30, 2014, provisional application No. 62/092,821, filed on Dec. 16, 2014.

(51) Int. Cl.
*H04W 28/04* (2009.01)
*H04W 40/02* (2009.01)
(Continued)

(52) U.S. Cl.
CPC ............ *H04L 45/32* (2013.01); *H04L 1/16* (2013.01); *H04L 1/1685* (2013.01);
(Continued)

(58) Field of Classification Search
CPC .......... H04L 45/32; H04L 1/16; H04W 28/04; H04W 40/02; H04W 88/04;
(Continued)

(56) References Cited

U.S. PATENT DOCUMENTS 8,396,032 B2      3/2013   Kato et al.
2008/0049749 A1*  2/2008   Xiao ................... H04L 1/1692
                                                    370/390
(Continued)

FOREIGN PATENT DOCUMENTS

KR    20080065823    7/2008
WO    2012099368     7/2012

OTHER PUBLICATIONS

Hiertz et al., IEEE 802.11s: The WLAN Mesh Standard, IEEE, Feb. 2010 (Year: 2010).*
(Continued)

*Primary Examiner* — Robert C Scheibel
*Assistant Examiner* — Manuel A. Ortiz Diaz
(74) *Attorney, Agent, or Firm* — Lee Hong Degerman Kang & Waimey

(57) ABSTRACT

The present disclosure relates to a method for message flooding in a wireless communication system, and is characterized in that it includes the steps of: broadcasting, by a transmission node, a flooding message to a surrounding node through a first common channel; checking, by a reception node, whether the first common channel has received the flooding message; transmitting, by the reception node, an ACK signal through a second common channel or a NACK signal through a third common channel, based (Continued)

on a result of the check; and determining, by the transmission node, whether the second common channel or the third common channel has detected a signal, to determine whether to re-transmit the flooding message.

4 Claims, 13 Drawing Sheets

(51) Int. Cl.
*H04W 52/00* (2009.01)
*H04L 12/721* (2013.01)
*H04L 1/16* (2006.01)
*H04L 1/18* (2006.01)
*H04L 1/00* (2006.01)

(52) U.S. Cl.
CPC .......... *H04L 1/1896* (2013.01); *H04W 28/04* (2013.01); *H04W 40/02* (2013.01); *H04L 2001/0093* (2013.01); *H04W 52/00* (2013.01); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/21* (2018.01); *Y02D 70/23* (2018.01); *Y02D 70/30* (2018.01)

(58) Field of Classification Search
CPC .............. H04W 28/021; H04W 40/023; Y02D 70/1264; Y02D 70/1224; Y02D 70/142; Y02D 70/146; Y02D 70/21; Y02D 70/00; Y02D 70/1262; Y02D 70/30; Y02D 70/164; Y02D 70/1242; Y02D 70/23; H04H 20/02; H04H 20/16; H04H 20/18; H04H 20/20; H04H 20/38; H04H 20/08; H04H 20/22; H04H 20/24
See application file for complete search history.

(56) References Cited

U.S. PATENT DOCUMENTS

| | | | | |
|---|---|---|---|---|
| 2009/0185521 | A1* | 7/2009 | Li | H04B 1/7107 370/315 |
| 2011/0289145 | A1* | 11/2011 | Kim | H04W 8/005 709/204 |
| 2012/0039231 | A1* | 2/2012 | Suri | H04L 67/104 370/312 |
| 2014/0185499 | A1* | 7/2014 | Ray | H04W 84/18 370/310 |
| 2014/0369250 | A1* | 12/2014 | Ren | H04L 1/0077 370/312 |

OTHER PUBLICATIONS

PCT International Application No. PCT/KR2015/007907, International Search Report dated Dec. 17, 2015, 2 pages.
Dualcomm Incorporated, "HARQ-ACK feedback for TDD eIMTA", R1-141435, 3GPP TSG-RAN WG1 #76bis, Apr. 2014, 4 pages.

* cited by examiner

[Figure 1]
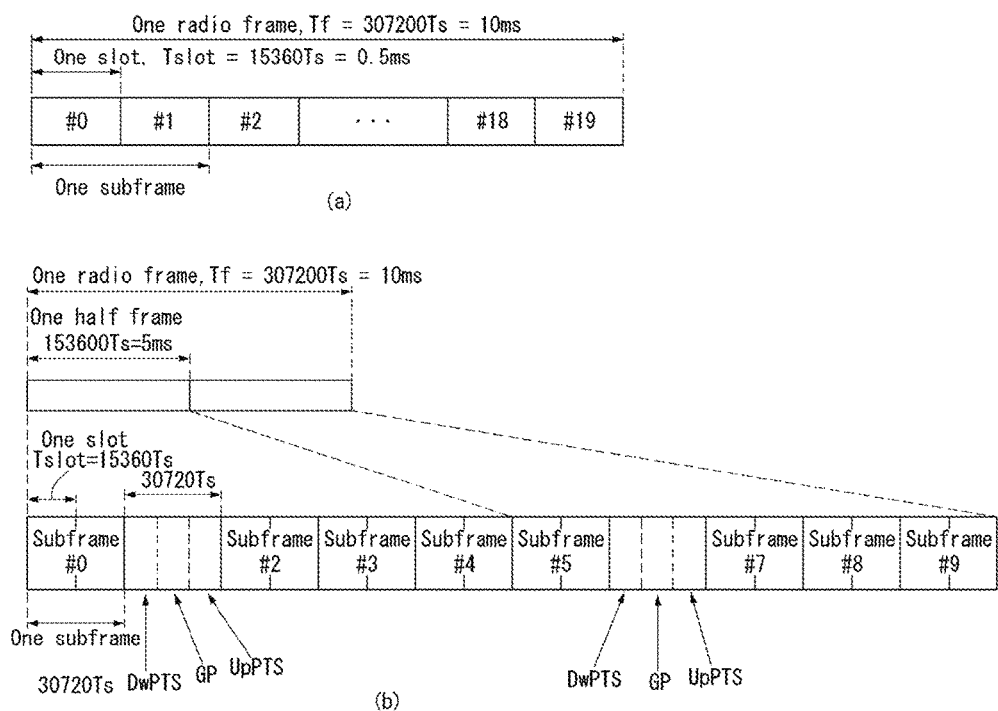

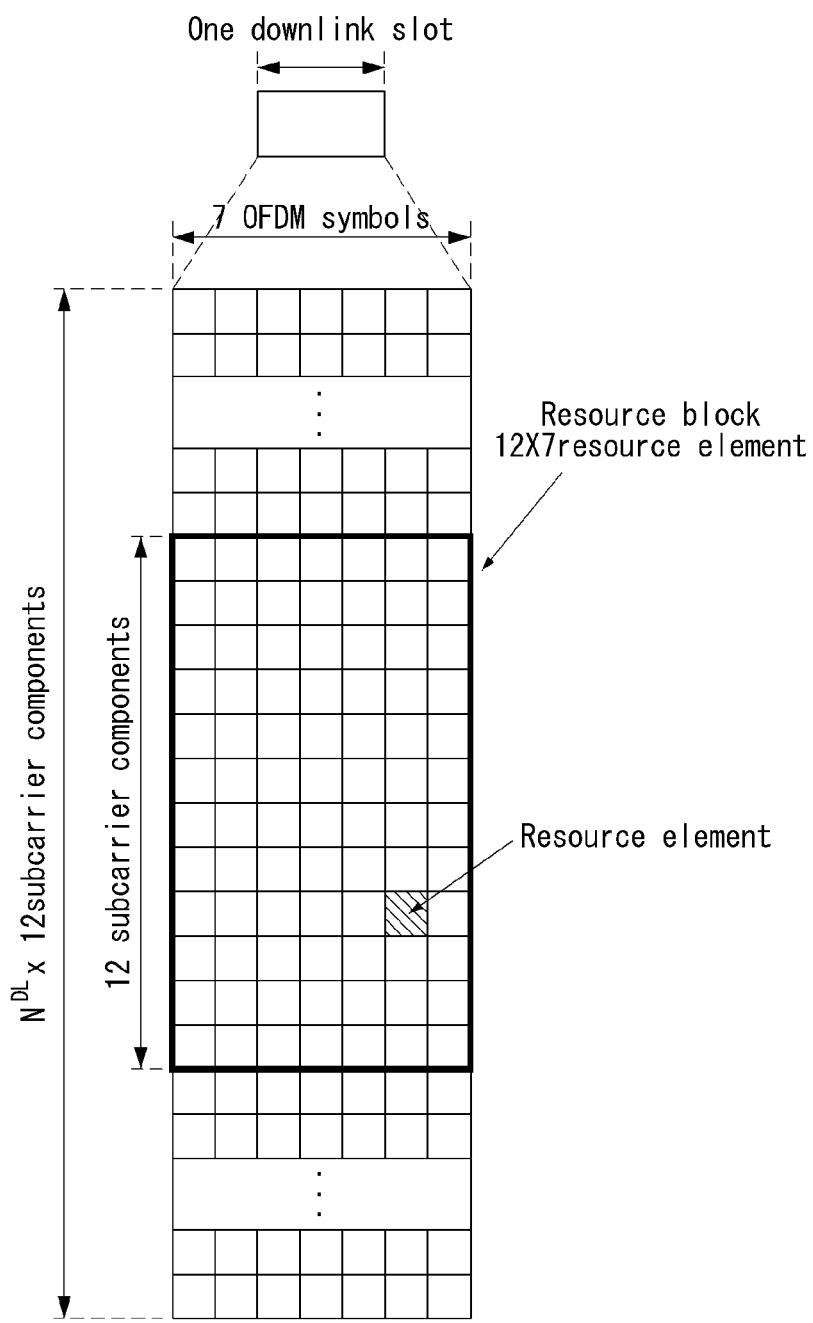
[Figure 2]

[Figure 3]
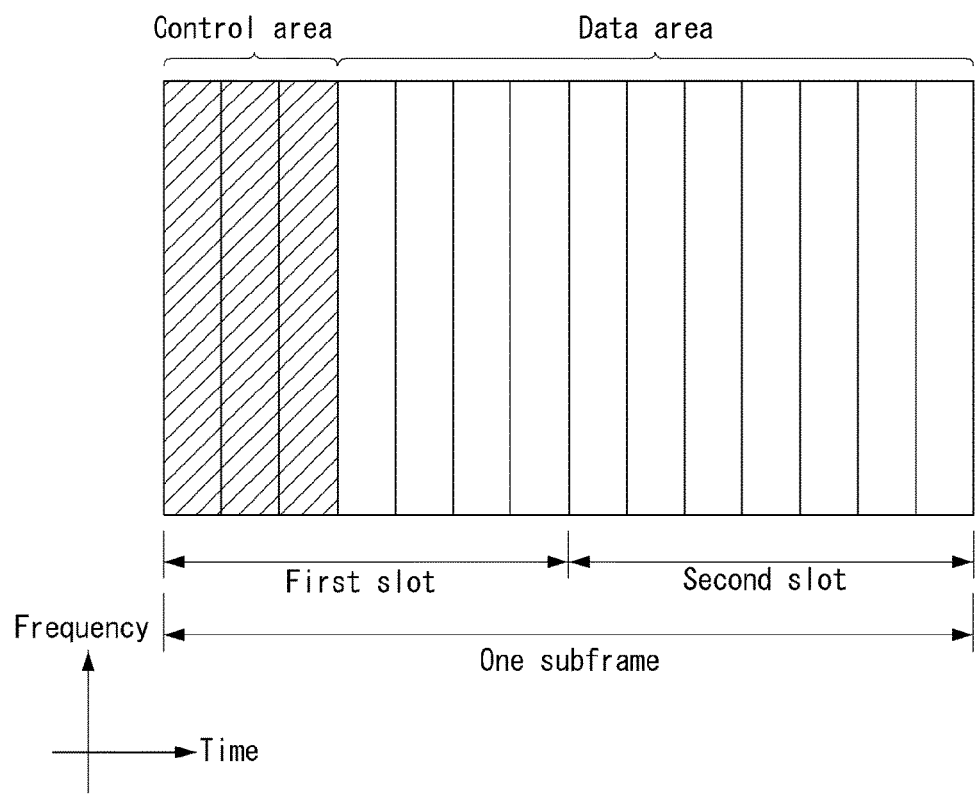

[Figure 4]
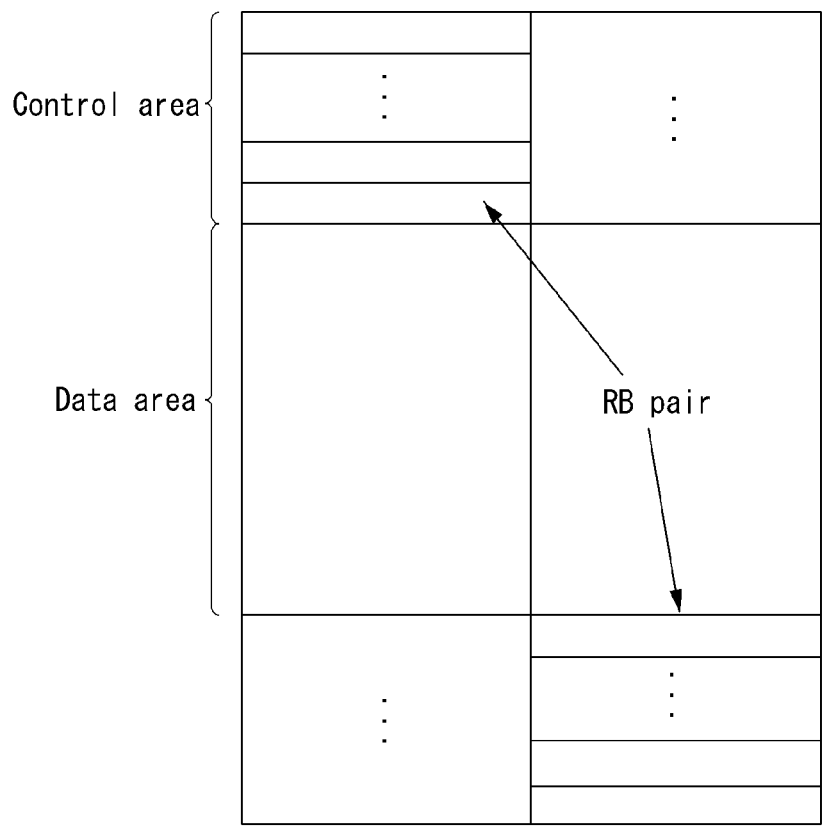
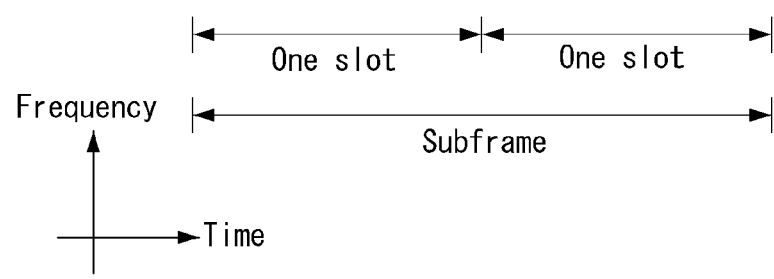

【Figure 5】
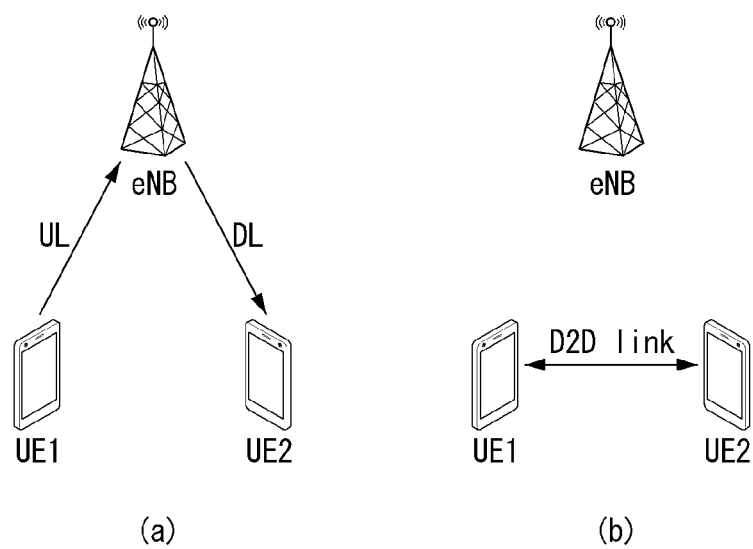

[Figure 6]
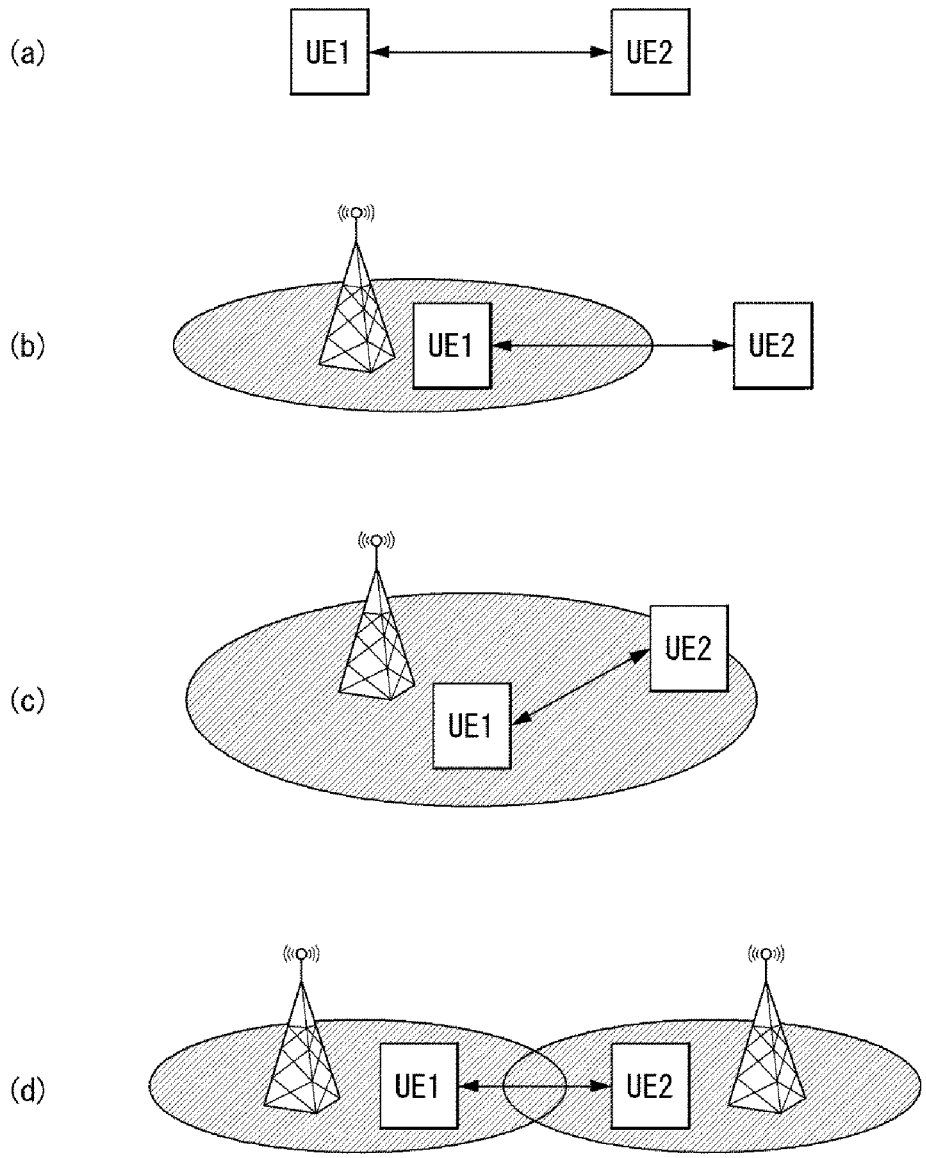

[Figure 7]
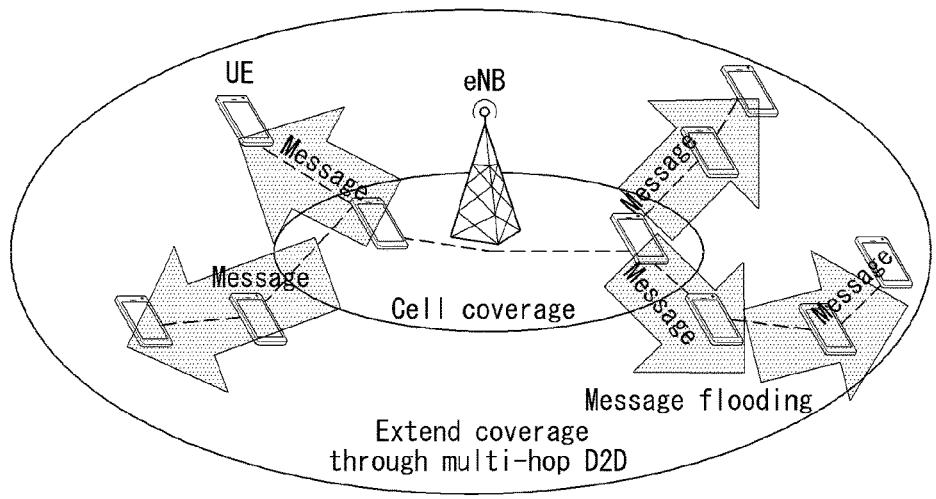
[Figure 8]
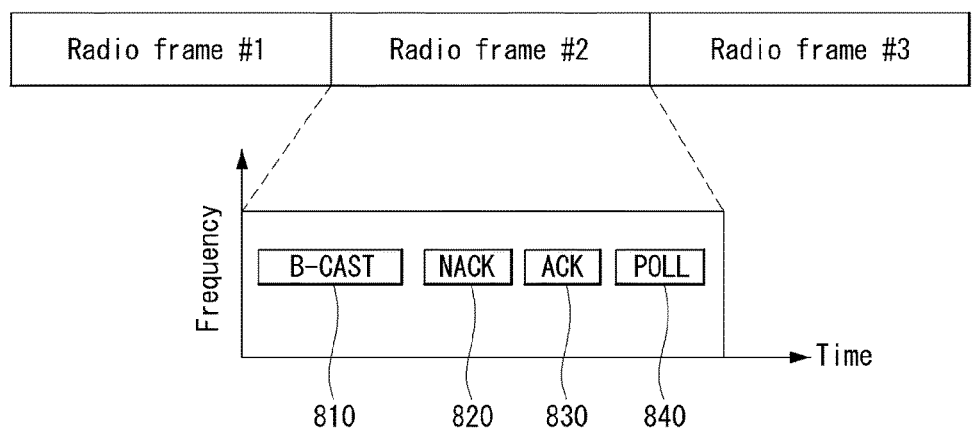

[Figure 9]
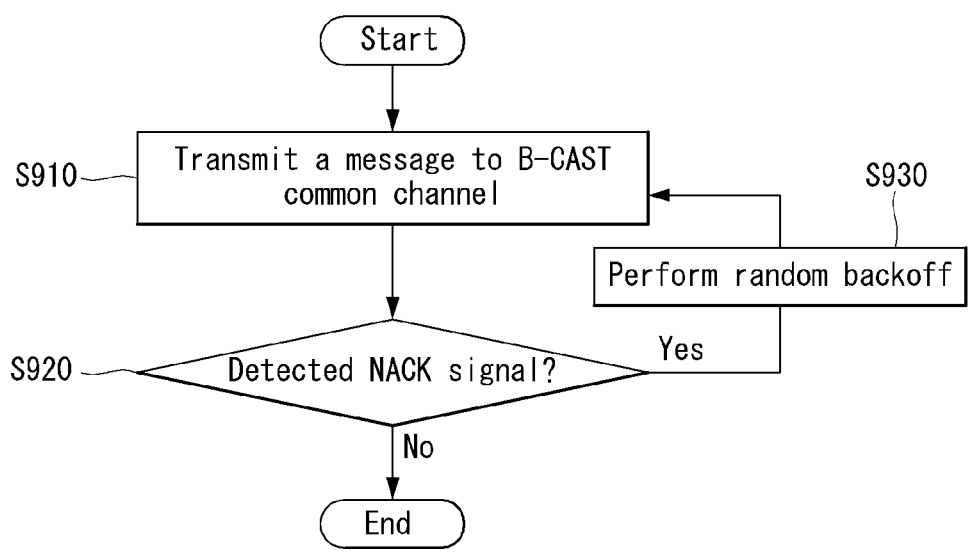

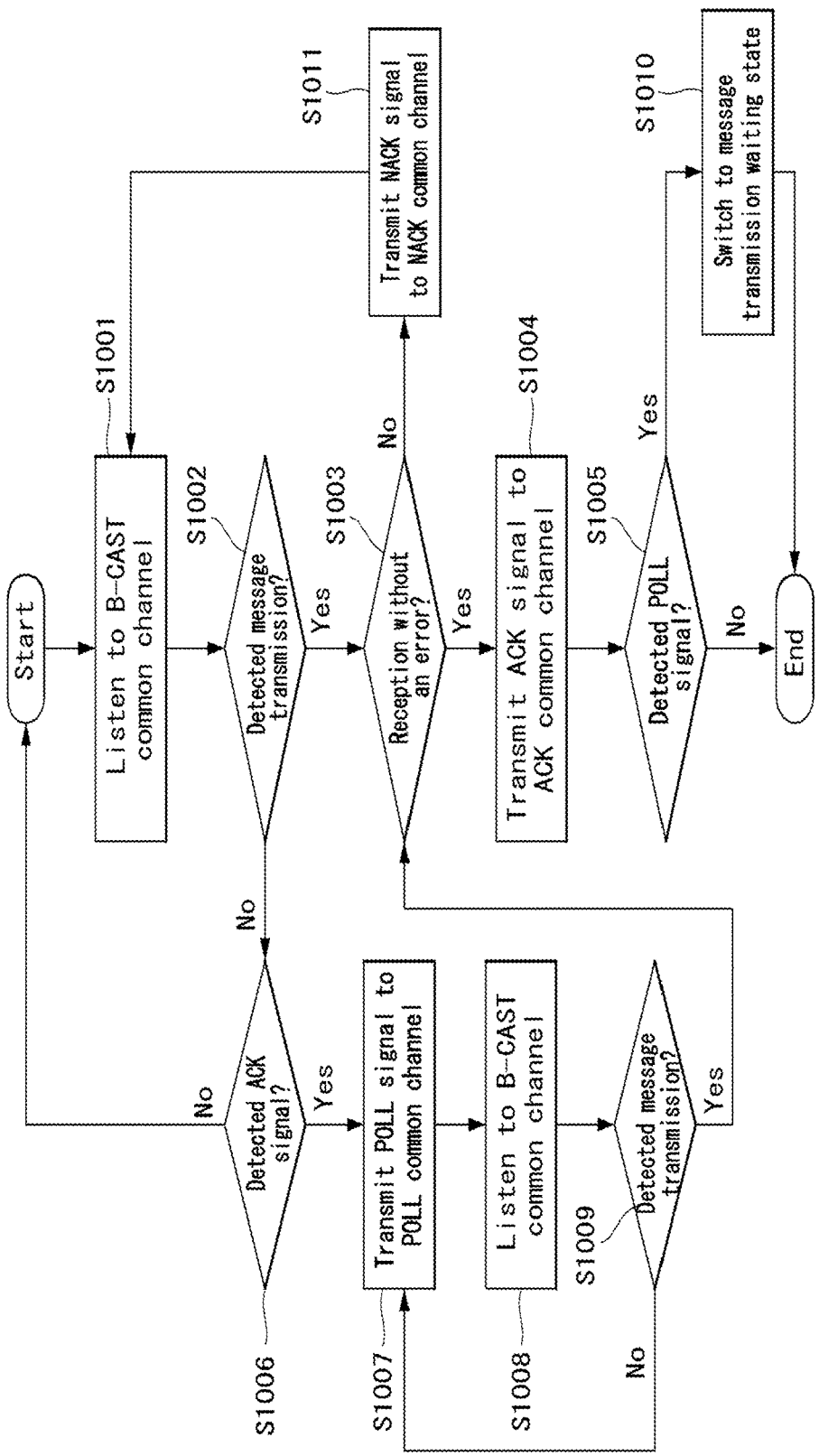
[FIG. 10]

【Figure 11】
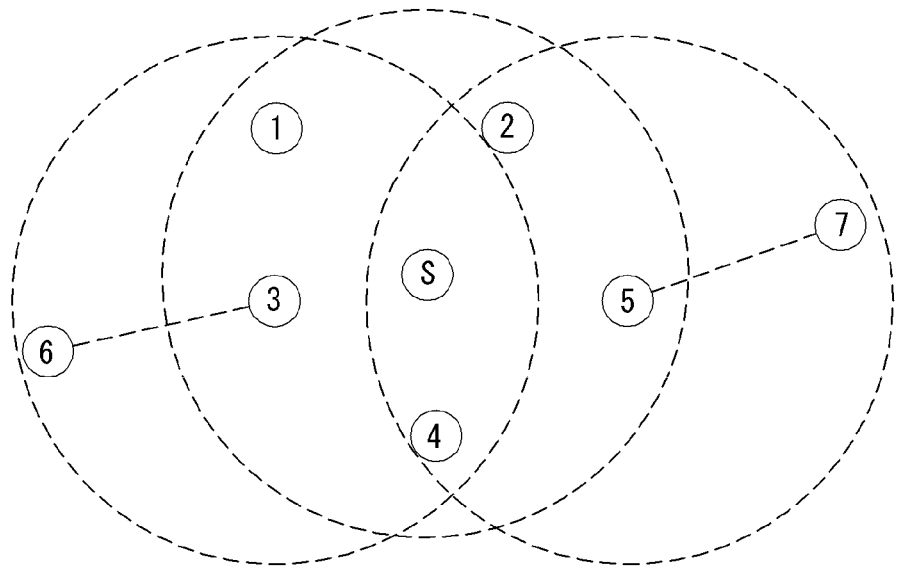
S:Source node
1,2,3,4,5:Neighboring nodes within transmission
          range of the source node
6,7:Nodes outside transmission range of the source node
【Figure 12】
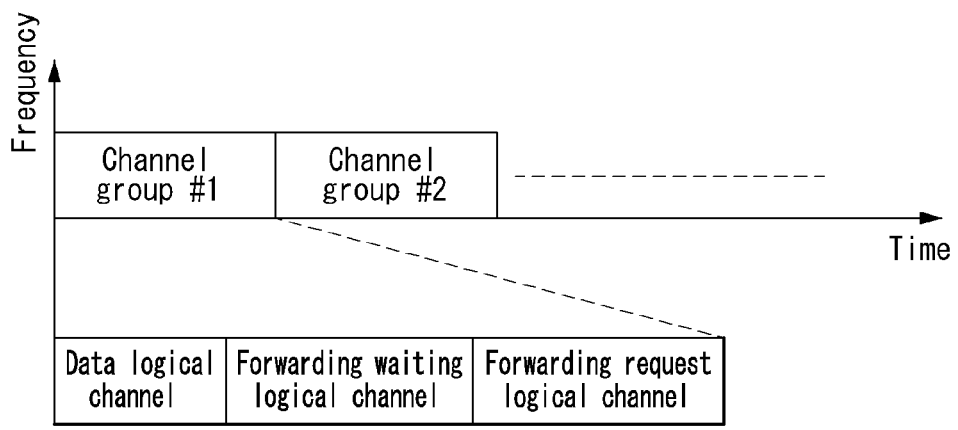

[Figure 13]
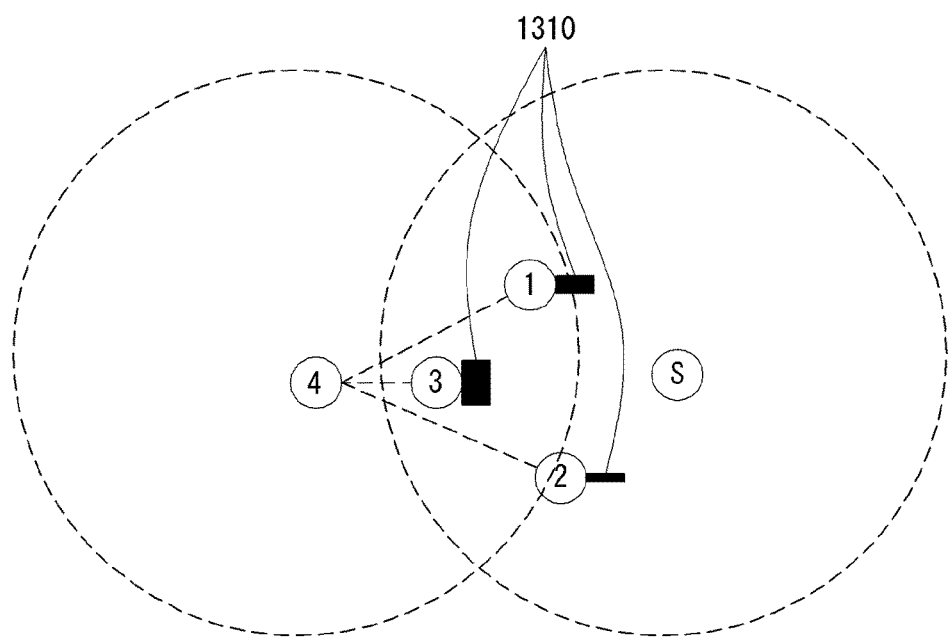
S: Source node
1, 2, 3, 4, 5: Neighboring nodes within transmission
             range of the source node
6, 7: Nodes outside transmission range of the source node

[Figure 14]
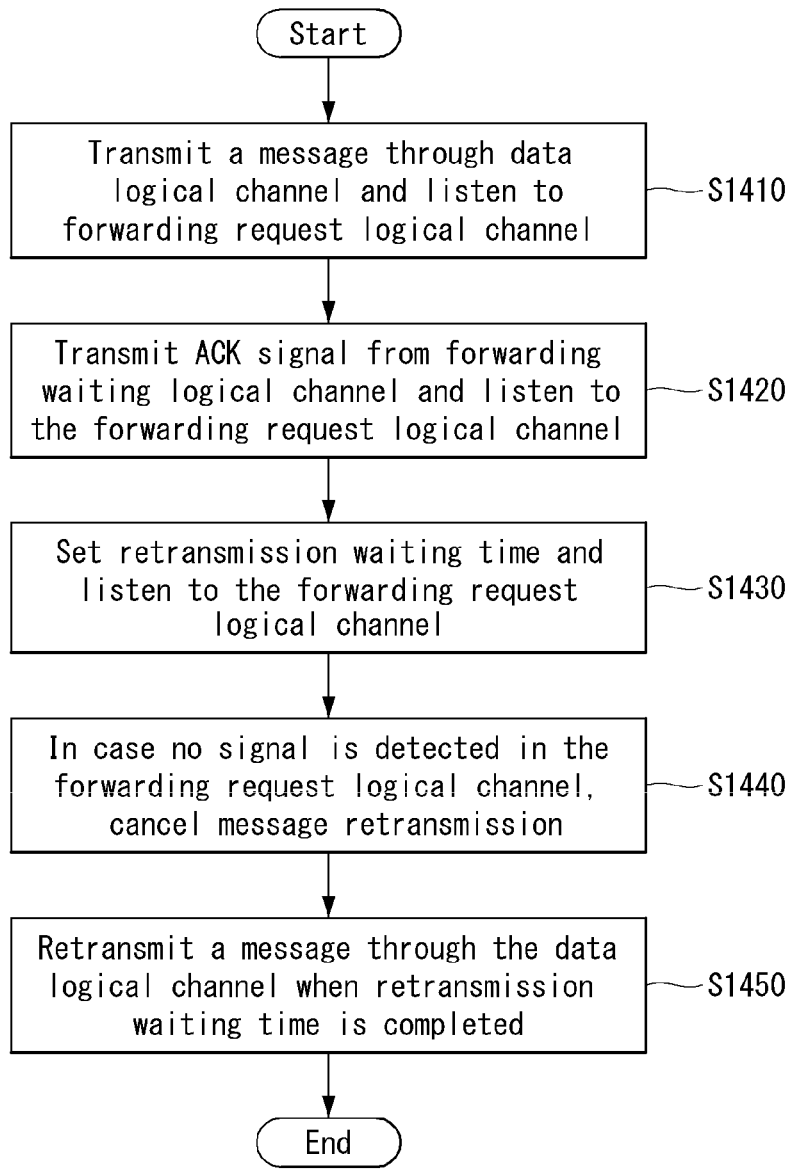

【Figure 15】
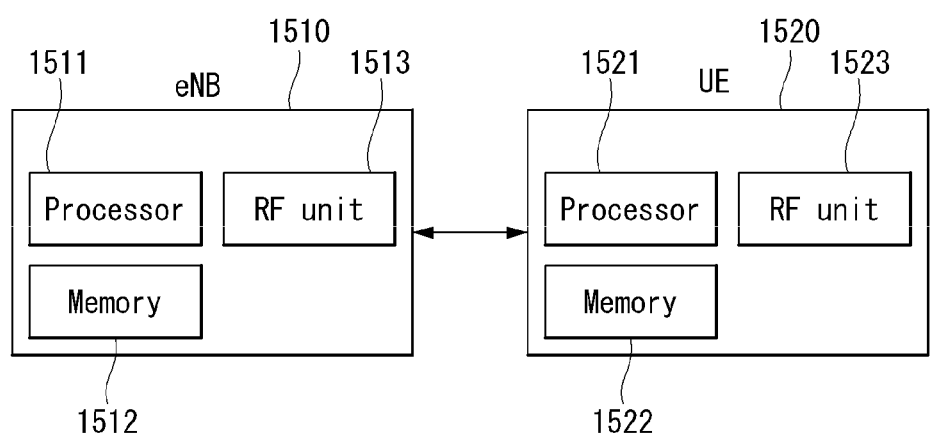

METHOD AND DEVICE FOR MESSAGE FLOODING IN WIRELESS COMMUNICATION SYSTEM

CROSS-REFERENCE TO RELATED APPLICATIONS

This application is the National Stage filing under 35 U.S.C. 371 of International Application No. PCT/KR2015/007907, filed on Jul. 29, 2015, which claims the benefit of U.S. Provisional Application No. 62/031,142, filed on Jul. 30, 2014 and 62/092,821, filed on Dec. 16, 2014, the contents of which are all hereby incorporated by reference herein in their entirety.

TECHNICAL FIELD

The present invention relates to a wireless communication system and more particularly, a method for performing message flooding in a wireless communication system supporting device-to-device communication and an apparatus supporting the method.

BACKGROUND ART

Mobile communication systems have been developed to provide voice services while ensuring the activity of a user. However, the mobile communication systems have been expanded to their regions up to data services as well as voice. Today, the shortage of resources is caused due to an explosive increase of traffic, and more advanced mobile communication systems are required due to user's need for higher speed services.

Requirements for a next-generation mobile communication system basically include the acceptance of explosive data traffic, a significant increase of a transfer rate per user, the acceptance of the number of significantly increased connection devices, very low end-to-end latency, and high energy efficiency. To this end, research is carried out on various technologies, such as dual connectivity, massive Multiple Input Multiple Output (MIMO), in-band full duplex, Non-Orthogonal Multiple Access (NOMA), the support of a super wideband, and device networking.

Direction communication between devices, that is, device-to-device (D2D) communication, refers to a communication method for setting up a direct link between a plurality of devices (e.g., a plurality of types of user equipments (UE) and directly exchanging voice and data between the plurality of devices without the intervention of an evolved NodeB (eNB).

DISCLOSURE

Technical Problem

An object of the present invention is to newly define channels for flooding a message to all network nodes except for a source node.

Also, an object of the present invention is to provide a method for retransmitting a message only when a node which has perceived message transmission makes an explicit request for retransmission.

Also, an object of the present invention is to provide a method for cancelling retransmission in case a signal is not detected in a message retransmission request channel.

Also, an object of the present invention is to provide a method for nodes located close to a node which requests message retransmission to retransmit a message first.

The technical objects to achieve in this document are not limited to those technical objects described above, but other technical objects not mentioned above may be clearly understood by those skilled in the art to which the present invention belongs from the specifications give below.

Technical Solution

A method for performing message flooding in a wireless communication system according to the present invention comprises a transmitting node's broadcasting a flooding message to neighboring nodes through a first common channel; a receiving node's checking reception of the flooding message from the first common channel; based on the checking result, the receiving node's transmitting an ACK signal through a second common channel or a NACK signal through a third common channel; and the transmitting node's determining whether to retransmit the flooding message by checking detection of a signal in the second or the third common channel.

Also, according to the present invention, the receiving node is divided into a first receiving node and a second receiving node, where the first receiving node refers to the node which has successfully received the flooding message, and the second receiving node refers to the node which has failed to receive the flooding message.

Also, the method according to the present invention further comprises the second receiving node's transmitting a poll signal for requesting retransmission of the flooding message through a fourth common channel.

Also, the poll signal according to the present invention is transmitted when the second receiving node does not detect transmission of the flooding message in the first common channel but detects ACK signal in the second common channel.

Also, the method according to the present invention further comprises stopping transmission of a NACK signal in case the second receiving node transmits the NACK signal for more than a predetermined number of times or energy of the NACK signal is higher than a predetermined value; and transmitting the poll signal through the fourth common channel.

Also, the method according to the present invention further comprises the first receiving node's retransmitting a flooding message received after random back-off through the first common channel.

Also, the retransmitting the flooding message according to the present invention is performed in case the first receiving node successfully receives the flooding message in the first common channel, and the poll signal is detected in the fourth common channel.

Also, the method according to the present invention further comprises stopping transmission of the poll signal in case the second receiving node receives the flooding message through the first common channel.

Also, the first, second, third, and fourth common channel according to the present invention are included in one radio frame and are repeated for each radio frame.

Also, a method for performing message flooding in a wireless communication system comprises a transmitting node's transmitting a flooding message to neighboring nodes through a first logical channel and listening to a second logical channel; a receiving node's checking reception of the flooding message in the first logical channel; and according to the checking result, the receiving node's transmitting ACK signal or transmitting a signal for requesting retransmission of the flooding message from the second logical channel, wherein the receiving node is divided into a first and a second receiving node, wherein the first receiving node refers to the node which has successfully received the flooding message, and the second receiving node refers to the node which has failed to receive the flooding message.

Also, according to the present invention, the ACK signal is transmitted in case the flooding message is successfully received, and the signal for requesting retransmission of the flooding message is transmitted in case the flooding message is not received successfully.

Also, the method according to the present invention further comprises the first receiving node's transmitting ACK signal and listening to the second logical channel.

Also, the signal for requesting retransmission of the flooding message according to the present invention is transmitted when the second receiving node fails to receive the flooding message through the first logical channel and detects ACK signal in the third logical channel.

Also, the method according to the present invention further comprises setting retransmission waiting time inversely proportional to strength of a signal received from the second logical channel in case the first receiving node detects the signal requesting retransmission of the flooding message in the second logical channel; and listening to the third logical channel.

Also, the method according to the present invention further comprises cancelling retransmission of the flooding message in case the first receiving node fails to detect a signal in the second logical channel before the retransmission waiting time is completed.

Also, according to the present invention, in case the first receiving node detects a signal in the second logical channel before the retransmission waiting time is completed, the flooding message is retransmitted through the first logical channel when the retransmission waiting time is completed.

Advantageous Effects

According to the present invention, since a message is retransmitted only when a node which has perceived message transmission explicitly requests retransmission of the message, unnecessary retransmission may be minimized, and collision due to message retransmission may be prevented.

Also, according to the present invention, in case a signal is not detected in a message retransmission request channel, retransmission may be cancelled, thereby preventing unnecessary retransmission beforehand and minimizing use of radio and energy resources of the whole network.

Also, according to the present invention, since nodes located close to the node which requests message retransmission retransmit the message, time required to complete message flooding may be minimized.

The advantageous effects that may be obtained from the present invention are not limited to the effects described above, but other advantageous effects not mentioned above may be clearly understood by those skilled in the art to which the present invention belongs.

BRIEF DESCRIPTION OF THE DRAWINGS

The accompanying drawings, which are included as part of a detailed description to provide further understanding of the invention, illustrate embodiments of the invention and together with the description serve to explain the principles of the invention.

FIG. 1 illustrates a structure of a radio frame in a wireless communication system to which the present invention may be applied.

FIG. 2 illustrates resource grids for one downlink slot in a wireless communication system to which the present invention may be applied.

FIG. 3 illustrates a structure of a downlink subframe in a wireless communication system to which the present invention may be applied.

FIG. 4 illustrates a structure of a uplink subframe in a wireless communication system to which the present invention may be applied.

FIG. 5 illustrates D2D communication in w wireless communication system to which the present invention may be applied.

FIG. 6 illustrates one example of various scenarios for D2D communication to which a method according to the present invention may be applied.

FIG. 7 illustrates one example of a method for message flooding in a coverage-extended network according to the present invention.

FIG. 8 illustrates one example of a common channel structure for message flooding according to the present invention.

FIG. 9 is a flow diagram illustrating one example of a method for operating a terminal in a message transmission waiting state according to the present invention.

FIG. 10 is a flow diagram illustrating one example of a method for operating a terminal in a message reception waiting state according to the present invention.

FIG. 11 illustrates one example of a normal method for message flooding.

FIG. 12 illustrates one example of s channel structure for message flooding in a synchronized multi-hop based wireless network according to the present invention.

FIG. 13 illustrates retransmission waiting time due to distances among nodes according to the present invention.

FIG. 14 is a flow diagram illustrating one example of a method for message flooding in a synchronized multi-hop based wireless network according to the present invention.

FIG. 15 illustrates one example of an internal block diagram of a wireless communication system to which method according to the present invention may be applied.

MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

FIG. 5 is a diagram for schematically describing the D2D communication in a wireless communication system to which the present invention may be applied.

FIG. 5a illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Unlink (referred to as a backhaul link as a link between base stations or a link between the base station and the repeater) and/or a Uu link (referred to as an access link as a link between the base station and the UE or a link between the repeater and the UE) which are defined in the exist ing wireless communication system may be related.

FIG. 5b illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

FIG. 6 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 6a illustrates an example of an out-of-coverage network scenario of the D2D communication.

The out-of-coverage network scenario means perform the D2D communication between the D2D UEs without control of the base station.

In FIG. 6a, only the UE1 and the UE2 are present and the UE1 and the UE2 may directly communicate with each other.

FIG. 6b illustrates an example of a partial-coverage network scenario of the D2D communication.

The partial-coverage network scenario means performing the D2D communication between the D2D UE positioned in the network coverage and the D2D UE positioned out of the network coverage.

In FIG. 6b, it may be illustrated that the D2D UE positioned in the network coverage and the D2D UE positioned out of the network coverage communicate with each other.

FIG. 6c illustrates an example of the in-coverage-single-cell and FIG. 6d illustrates an example of the in-coverage-multi-cell scenario.

The in-coverage network scenario means that the D2D UEs perform the D2D communication through the control of the base station in the network coverage.

In FIG. 6c, the UE1 and the UE2 are positioned in the same network coverage (alternatively, cell) under the control of the base station.

In FIG. 6d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 6, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated association with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

In what follows, a method for message flooding according to the present invention will be described in detail with reference to related drawings.

More specifically, a method for message flooding according to the present invention uses D2D communication (sidelink communication) to allow UEs within cell coverage to form a multi-hop network with UEs outside the cell coverage.

Through the method above, in a coverage-extended LTE network which allows communication among UEs outside the cell coverage and an eNB, the eNB is allowed to transmit a flooding message to neighboring UEs with a minimum loss and without using topology information.

FIG. 7 illustrates one example of a method for message flooding in a coverage-extended network according to the present invention.

One network shown in FIG. 7 comprises an eNB and one or more UEs.

One or more UEs may be located within or out of service coverage of the eNB.

At this time, the UEs located within service coverage of the eNB may be denoted as inside-cell-coverage UEs described above while those UEs located outside service coverage may be denoted as out-of-cell coverage UEs.

For the convenience of description, the inside-cell-coverage UEs may be expressed as first UEs, and the out-of-cell coverage UEs may be expressed as second UEs.

At this time, the UEs within service coverage of the eNB form a multi-hop network with those UEs located outside the service coverage but accessible through direct communication to enable communication among the eNB and the UEs located outside the service coverage thereof.

One network shown in FIG. 7 assumes that common channels to be described with reference to FIG. 8 (B-CAST channel, ACK channel, NACK channel, and POLL channel) are reserved, and the common channels are utilized for flooding a message generated by the eNB.

FIG. 8 illustrates one example of a common channel structure for message flooding according to the present invention.

As shown in FIG. 8, a common channel for message flooding may be divided into (a) broadcast channel (B-CAST) 810, (2) NACK channel 820, (3) ACK channel 830, and (4) POLL channel 840.

First, the broadcast (B-CAST) channel indicates a resource block, resource, channel, and the like used for an eNB and/or UE to transmit (retransmit, transmit repeatedly, or repeatedly transmit within a time period) a flooding message.

Next, NACK channel indicates a resource block used to transmit a NACK signal by UEs which have detected transmission of a message from a B-CAST resource block but failed to receive the corresponding message (or a signal that doesn't meet a predefined criterion) properly.

The predefined criterion may be signal strength.

Next, ACK channel indicates a resource block used to transmit an ACK signal by UEs which have received a message from the B-CAST resource block without an error (or a signal which meets a predefined criterion).

At this time, the resource may indicate a resource area composed of time, frequency, space, and symbols.

Next, POLL channel indicates a resource block used to transmit a POLL signal by UEs which have failed to receive a transmission signal from the B-CAST resource block but received an ACK signal from a subsequent ACK channel.

At this time, the POLL signal or POLL channel may be regarded as a signal for a UE to request transmission of a message again (or relaying the message again) by transmitting a POLL signal when it is determined that other neighboring UEs but the UE itself seem to have received the message.

The common radio channels for message flooding may adopt the physical resource block (PRB) structure defined in the LTE(-A) system, and each individual common channel may be composed of a plurality of PRB sets.

And the B-CAST, NACK, ACK, and POLL common channel may be arranged in the order of time.

At this time, the order of the common channels and resources used have to be defined beforehand so that all of the UEs may recognize them.

Resources of the common channels may be configured by a high layer signal or may be notified to all of the UEs through a physical layer signal.

Also, as shown in FIG. 8, the common channels may have a structure repeated for each radio frame.

As one example, the common channels may be transmitted once or more for one radio frame interval.

Different from FIG. 8, the structure according to which the common channels are repeated may be configured to have various periods and lengths.

In what follows, message flooding operation according to the present invention will be described in more detail.

In other words, a method for message flooding according to the present invention is based on the following processes: (1) utilization of ACK/NACK channel for reliable message broadcasting, (2) utilization of a POLL channel which ensures message flooding to the entire network without using topology information, and (3) change from NACK to POLL channel for changing a message transmission UE.

In what follows, processes (1) to (3) will be described in more detail.

(1) Utilization of ACK/NACK Channel for Reliable Message Broadcasting

First, an eNB (or a relay UE) which attempts to perform message flooding transmits a flooding message to neighboring UEs through the B-CAST common channel.

Afterwards, a receiver side (or a receiving UE or receiving UEs) detects transmission of a message from the B-CAST common channel.

At this time, the UEs which have received the message successfully without an error through the B-CAST common channel transmit ACK signal through the ACK common channel.

However, those UEs which have failed to receive the message through the B-CAST common channel transmit a NACK signal to the NACK common channel.

At this time, the eNB (or relay UE) which has transmitted a flooding message through the B-CAST common channel determines whether to retransmit the flooding message according to existence of a signal in the ACK and NACK common channel.

In other words, Table 2 describes the specific operation of the eNB according to existence of the ACK or NACK signal in the ACK or NACK common channel.

TABLE 2

| NACK channel signal detected | ACK channel signal detected | eNB (or relay UE) operation |
|---|---|---|
| X | O | Assumes success of transmission of a flooding message and stops transmitting flooding messages |
| O | O | Recognizes a UE (or node) which has failed to receive a flooding message and starts retransmitting the flooding message |
| O | X | |
| X | X | Determines that no UE (or node) exists within a signal transmission range and stops transmitting a flooding message |

(2) Utilization of POLL Signal which Guarantees Message Flooding Over the Whole Network without Using Topology Information In case a UE fails to detect transmission of a (flooding) message through the B-CAST common channel, but detects an ACK signal transmitted by other UEs from the ACK common channel, the UE transmits a POLL signal periodically through the POLL common channel.

At this time, in case a POLL signal is detected from the POLL common channel, the UEs which have successfully received a message from the B-CAST common channel may recognize existence of a UE outside the transmission range of the UEs which have received the message through the B-CAST common channel.

In this case, the UEs which have successfully received the message retransmit the message received after random backoff through the B-CAST common channel.

If the UE transmitting a POLL signal through the POLL channel detects reception of a message from the B-CAST common channel, transmission of the POLL signal is stopped.

(3) Change from NACK to POLL Signal for Changing the UE Transmitting a Message

In case link quality between a UE transmitting a flooding message (transmitting UE) and a UE receiving the corresponding message (receiving UE) is poor, the receiving UE transmits a NACK signal continuously through the NACK common channel.

At this time, in case the second receiving node transmits the NACK signal for more than a predetermined number of times or accumulated energy of the NACK signal is higher than a predetermined value, it determines that the link quality between the transmitting UE and itself is poor, stops transmitting the NACK signal, and starts to transmit a POLL signal instead of the NACK signal.

A UE which transmits a POLL signal instead of a NACK signal may receive a message transmitted by another UE.

FIG. 9 is a flow diagram illustrating one example of a method for operating a UE in a message transmission waiting state according to the present invention.

In the figure, a UE in the message transmission waiting state refers to the UE capable of receiving a flooding message normally and transmitting the flooding message to other UEs.

More specifically, the UE in the message transmission waiting state refers to the UE capable of successfully receiving a flooding message from an eNB through the B-CAST common channel without an error (and transmitting an ACK signal) and (re)transmitting the flooding message to other UEs in case the UE detects a NACK signal or a POLL signal by monitoring the NACK common channel or POLL common channel.

Also, the message transmission waiting state may refer to the state in which a UE receives a flooding message and stands by before (re)transmitting the flooding message to other UEs or the state in which the UE monitors the NACK common channel or POLL common channel.

With reference to FIG. 9, the UE transmits a flooding message to other UEs through the B-CAST common channel S910.

At this time, the UE is assumed to be in the message transmission waiting state.

Afterwards, the UE checks detection of a NACK signal through the NACK common channel S920.

At this time, detection of the NACK signal may indicate that a signal with a predetermined signal strength or more is detected.

If a NACK signal is detected from the checking result, the UE (re)transmits the flooding message through the B-CAST channel after performing random backoff S930.

Also, in case a NACK signal is not detected from the checking result, the UE stops (or terminates) (re)transmission of the flooding message.

FIG. 10 is a flow diagram illustrating one example of a method for operating a UE in a message reception waiting state according to the present invention.

In the figure, a UE in the message reception waiting state refers to the UE which transmits a NACK or a POLL signal as it has failed to receive a flooding message.

With reference to FIG. 10, the UE listens to the B-CAST common channel S1001. It is assumed that the UE is in the message reception waiting state.

Next, the UE checks detection of message transmission in the B-CAST common channel S1002.

In case message transmission is detected in the B-CAST common channel from the checking result, the UE checks whether the corresponding message has been received without an error S1003.

In case it is determined from the checking result that the message has been received without an error, the UE transmits an ACK signal through the ACK common channel S1004.

However, if it turns out from the checking result that the UE has failed to receive the message, the UE transmits a NACK signal through the NACK common channel S1011.

Next, the UE checks whether a POLL signal is detected S1005.

In case the POLL signal is not detected, the UE terminates the operation related to message flooding.

Also, in case the UE fails to detect message transmission in the B-CAST common channel, the UE checks whether an ACK signal transmitted from another UE is detected in the ACK common channel S1006.

In case the ACK signal is not detected from the checking result, the UE returns to the S1001 step and listens to the B-CAST common channel again.

However, in case the UE detects the ACK signal, the UE determines that there is an unreceived message and transmits a POLL signal to request retransmission of the message through the POLL common channel S1007.

After the S1007 step is performed, the UE checks whether the message has been transmitted S1009 by listening again to the B-CAST common channel S1008.

In other words, the UE checks message transmission through the B-CAST common channel S1009.

At this time, in case the UE fails to detect message transmission, the UE transmits a POLL signal again through the POLL common channel of the S1008 step.

However, in case the UE detects message transmission, the UE performs the S1003 step, namely the step of checking whether the corresponding message has been received without an error.

Also, in case the UE detects the POLL signal from the checking result of S1005 step, the UE switches to the message transmission waiting state S1010.

Afterwards, the UE performs the operation specified for a UE in the message transmission waiting state as described with reference to FIG. 9.

As described above, a message flooding method according to the present invention increases stability of 1-hop transmission by utilizing the NACK common channel and signal of a fixed size.

Also, since the message flooding method utilizes the ACK common channel and POLL common channel of a fixed size, the number of message retransmission may be reduced, thereby reducing the probability of collision between messages.

Also, the message flooding method may prevent a message from being retransmitted unnecessarily as the UEs located outside coverage of a transmitting UE broadcasting a message overhear the ACK signal transmitted by other UEs and accordingly request message flooding by using a POLL signal in the on-demand manner.

Another characteristic of the message flooding method according to the present invention provides an advantage that message flooding may be performed or a message may be retransmitted without using topology information.

Another Embodiment

Another embodiment of a message flooding method according to the present invention broadcasts a message transmitted from a source node (eNB or relay UE) over the entire nodes except for the source node in a synchronized, multi-hop based wireless network.

In particular, different from existing methods in which a node receiving a flooding message performs retransmission arbitrarily, the message flooding method according to the present invention performs retransmission of the flooding message only when there is an explicit request from a node which has recognized transmission of a flooding message.

The flooding service described in this document refers to the service in which a message transmitted by a source node is broadcast over the entire nodes.

The flooding service in a multi-hop based wireless network may be utilized for a destination node search, path planning, propagation of a network control message, propagation of an emergency message, and so on.

Performance of the flooding service may be described largely by (1) efficiency and (2) reliability.

First, efficiency of a flooding service may be represented by the number of retransmission and a time period required for delivering a message over the whole network, and reliability of the flooding service may be represented by the ratio of the number of nodes which have received the message to the total number of nodes.

In general, if it is the case that the number of retransmission is small, and the time period used for the message transmission is short, the corresponding flooding service may be regarded as being performed efficiently, and if a more number of nodes receive the message across the whole network, it may be considered that the corresponding flooding service has been performed more reliably.

Also, the synchronized, multi-hop based wireless network according to the present invention provides time resources and frequency radio resources by logically distinguishing them from each other.

In this manner, a radio resource distinguished logically is called a 'logical channel'.

The logical channel may be determined to have a various form and size, and the intended use of the logical channel may be predetermined before operation of the network.

For example, the entire radio resources of a network may be divided into data logical channels and control logical channels.

In other words, those nodes trying to transmit a message to a destination node may transmit the message via a data logical channel through arbitrary connection while the destination node or relay UE (or node) which receives the corresponding message may transmit whether it has successfully received the message, transmission of which has been detected through the data logical channel successfully, to the node which has transmitted the message through the control logical channel.

In what follows, conventional methods will be described briefly before a message flooding method according to the present invention is described.

Conventional Method 1

A basic message flooding method in a synchronized multi-hop based wireless network operates such that a source node transmits a message via a logical channel to a destination node of which the destination address is given by the broadcast address, and the nodes (or UEs) which initially receive the message with the broadcast address retransmit the corresponding message unconditionally after a predetermined time period (conventional method 1).

In this way, in case message flooding is completed according to the conventional method 1, the number of UEs in the whole network becomes the same as the number of message retransmission.

However, since a plurality of UEs receiving a message according to the conventional method 1 attempt retransmission within a short time period, possibility of collision among messages in the data logical channel is increased, and unnecessary retransmission of a message may occur.

For example, suppose a source node transmits a flooding message through the data logical channel, N neighboring nodes area distributed around the source node, and n (n<N) out of the N neighboring nodes require retransmission to transmit the message across the whole network.

At this time, the n neighboring nodes may communicate with the nodes located outside the transmission range of the source node.

In this case, since all of the neighboring nodes attempt retransmission within a short time interval, collision in the data logical channel during the attempt for message retransmission may occur.

Moreover, since (N−n) neighboring nodes which do not need retransmission any more will also attempt retransmission, radio resources may be unnecessarily wasted.

The situation described above may become worse according as the density of nodes within the network is increased.

FIG. 11 illustrates one example of a normal method for message flooding.

FIG. 11 illustrates message flooding when N=5, and n=2.

In the figure, S represents a source node, 1, 2, 3, 4, 5 represent neighboring nodes within transmission range of the source node, and 6, 7 represent the nodes located outside the transmission range of the source node.

With reference to FIG. 11, in case the source node S transmits a message from a data logical channel, the node 1, 2, 3, 4, and 5 receiving the message attempt to retransmit the message after a predetermined time period since the corresponding message has been received for the first time.

In case two or more nodes attempt message retransmission simultaneously, collision may occur while message retransmission is attempted, and thus the probability of interpreting the corresponding message without an error for the nodes which have detected the corresponding transmission becomes considerably low.

Also, since node 1, 2, and 4 attempt unnecessary message retransmission even though there is no UE which will receive the message being retransmitted, valuable radio resources are wasted.

Conventional Method 2

As described above, to improve the drawbacks of the conventional method 1, a different message flooding method has been proposed. When a node receives a flooding message from a data logical channel, retransmission waiting time is set to be short for weak received signal strength, and in case neighboring nodes do not detect retransmission of a message until the retransmission waiting time is completed, the corresponding node directly attempts retransmission (conventional method 2).

In the conventional method 2, a message transmitting node and distant nodes from the message transmitting node first retransmit a message while a node receiving the same message repeatedly gives up retransmission, by which possibility of collision during retransmission is reduced, and unnecessary retransmission is somewhat reduced.

However, since essential retransmission may not be performed due to the network topology and retransmission order among nodes, the transmission range for message flooding may not be extended across the whole network.

To remedy the aforementioned drawback, a method for performing unconditional message retransmission when received signal strength is below a predetermined value (or threshold value), a method for performing unconditional message transmission when retransmission of the same message is received more than once, and so on have been proposed; however, since the conventional method 2 invokes retransmission of an additional message, the operation of the conventional method 2 may become similar to that of the basic flooding method.

Conventional Method 3

Different from the conventional method 2, a still another method for message flooding determines whether to perform message retransmission with a fixed probability p when a node receives a message to be flooded in the data logical channel (conventional method 3).

Different from the conventional method 1, since the conventional method 3 determines retransmission with a probability smaller than 1, the number of retransmission may be reduced approximately by 100×(1−p) % with respect to the whole network.

However, since there may be chances that essential retransmission is not performed due to the network topology and requirement for retransmission, transmission range according to message flooding may not be extended across the whole network like the conventional method 2 described above.

Conventional Method 4

A yet another method for maximizing a message propagation range due to flooding feeds back the information about whether a message has been successfully received to a message transmitting node when the corresponding message to be flooded is detected, by which the message transmitting node determines whether to retransmit the message according to the feedback result (conventional method 4).

In the conventional method 4, a node which detects message transmission may provide feedback information about success or failure of receiving the corresponding message. And the message transmitting node is able to re-attempt message retransmission by checking the feedback information; therefore, a message may be propagated reliably irrespective of network topology.

However, since all of the neighboring nodes receiving a retransmitted message have to transmit a feedback message, efficiency of using radio resources may become poor, and in case an error occurs in the topology information, an undesired operation may be performed with a high probability.

In what follows, as another embodiment, a message flooding method according to the present invention will be described additionally.

The present invention provides a message flooding method which minimizes retransmission of a flooding message in a synchronized, multi-hop based wireless network and maximizes a propagation range of a flooding message up to the scale of the whole network.

FIG. 12 illustrates one example of s channel structure for message flooding in a synchronized multi-hop based wireless network according to the present invention.

As shown in FIG. 12, a synchronized, multi-hop based wireless network according to the present invention supports at least three logical channels for message flooding: (1) data logical channel 1210, (2) forwarding waiting logical channel 1220, and (3) forwarding request logical channel 1230.

As described in FIG. 12, the three newly defined logical channels may be arranged in the order of data logical channel, forwarding waiting logical channel, and forwarding request logical channel; or may be repeated in the form of a group as time passes.

In other words, one channel group (channel group #1, channel group #2, and so on) may include three logical channels. And each channel group may be repeated along the time axis.

Also, nodes within the synchronized, multi-hop based wireless network basically in the (message) reception waiting state in the three logical channels.

The node may represent a UE or an eNB. Therefore, a transmitting node may represent a transmitting UE or an eNB while a receiving node may represent a receiving UE.

In what follows, a method for utilizing the respective logical channels will be described more specifically.

At this time, each logical channel may indicate a first logical channel, second logical channel, or third logical channel.

First, a data logical channel represents a radio resource area into which a flooding message is actually transmitted.

Also, a forwarding waiting logical channel represents a radio resource area through which a UE which has properly received a message from the data logical channel transmits a detectable signal such as the ACK signal.

Also, a forwarding request logical channel represents a radio resource area into which UEs (or nodes), which have failed to detect a signal in the data logical channel or have failed to receive the message properly from the data logical channel, but have detected a signal transmitted from the forwarding waiting logical channel, send a detectable signal for requesting message retransmission.

The form of a signal transmitted from the forwarding waiting logical channel may be the same as or different from that transmitted from the forwarding request logical channel; since detection of the corresponding signal is performed on the basis of energy level, a receiving UE may detect the corresponding signal without any problem even if several UEs transmit signals at the same time.

In what follows, operation of nodes for message flooding in a synchronized, multi-hop based wireless network will be described in more detail.

First, in case there is a message to be flooded, a source node transmits a message from the data logical channel of a channel group which starts first.

At this time, the source node corresponds to a node which transmits the flooding message to other nodes for the first time.

Afterwards, the source node remains (or operates) in the reception waiting state in the forwarding request logical channel located next to the data logical channel.

At this time, those nodes located within transmission range of the source node among the nodes under the reception waiting state in the data logical channel detect a (flooding) message transmitted by the source node and attempt to interpret the detected message.

In case no error is found from interpretation of the message, the nodes (which are located within transmission range of the source node) transmit a signal which allows energy detection, such as the ACK signal, from the forwarding waiting logical channel located next to the data logical channel and remain under the reception waiting state in the forwarding request logical channel located next to the forwarding waiting logical channel.

At this time, a plurality of nodes may transmit a signal from the forwarding waiting logical channel simultaneously, but as described above, there is no serious problem in detecting the corresponding signal.

Also, those nodes which have failed to detect a message transmitted from the data logical channel or which have detected but failed to receive the message are remained under the reception waiting state in the forwarding waiting logical channel.

In case the nodes remaining under the reception waiting state in the forwarding waiting logical channel detect a signal transmitted from the forwarding waiting logical channel, they determine that there exists a flooding message to be received yet.

In this case, the corresponding nodes transmit a signal that may be detected in the forwarding request logical channel located next to the forwarding waiting logical channel.

In the same manner, even though a plurality of nodes may transmit signals from the forwarding request logical channel at the same time, there is no serious problem in detecting the corresponding signal.

And the nodes which have started to transmit a signal from the forwarding request logical channel continue to transmit a signal through the forwarding request logical channel until the message is received.

However, in case the message is not received until a predetermined channel group is passed, the nodes stops transmitting the signal.

Through the aforementioned process, a message to be flooded may be explicitly requested for retransmission within the network, and the transmission range for message flooding may be maximized.

At this time, those nodes under the reception waiting state in the forwarding request logical channel may be either the nodes (source nodes) which have transmitted a message from the data logical channel or those nodes which have received the message properly and transmitted a signal from the forwarding waiting logical channel.

The nodes remaining under the reception waiting state in the forwarding request logical channel search for a signal transmitted from the forwarding request logical channel. Upon detection of a signal transmitted from the forwarding request logical channel, the nodes determine that there are neighboring nodes requesting transmission of the most recently received message and reserve for retransmission.

At this time, the retransmission is performed through the data logical channel after retransmission waiting time is passed.

At this time, the retransmission waiting time is set inversely proportional to the strength of a signal detected from the forwarding request logical channel.

The aforementioned scheme is introduced to allow the node closest to those nodes requesting message transmission from the forwarding request logical channel may participate in the retransmission first.

Also, the retransmission waiting time unit may be the number of channel groups, and actual retransmission waiting time may differ according to the length of the channel group.

FIG. 13 illustrates retransmission waiting time due to distances among nodes according to the present invention.

In FIG. 13, the circles (1,2,3,4,S) indicated by solid lines represent nodes (or UEs), and black bars 1310 displayed to the right of node 1, 2, and 3 represent strengths of signals received by the respective nodes in response to the signal that the node 4 has transmitted from the forwarding request logical channel.

More specifically, S represents a source node, and node 1, 2, and 3 represent the nodes located within transmission range of the source node S, which transmit a signal through the forwarding request logical channel.

Also, node 4 represents a node located out of the transmission range of the source node S and transmits a signal from the forwarding request logical channel.

Also, size of the black bar 1310 is proportional to the strength of a signal received by each node.

As shown in FIG. 13, the signal transmitted from the node 4 exhibits the highest received signal strength at node 3.

Therefore, retransmission waiting time of the node 3 is set to be shorter than those of the node 1 and node 2.

In other words, through the aforementioned principle, a message may be delivered to as many nodes as possible with a single retransmission.

Also, through the processes described above, those nodes in the retransmission waiting state search for a signal until the retransmission waiting time of the respective nodes is completed while being under the reception waiting state in the forwarding request logical channel of an ensuing channel group.

If no further signal is detected from the forwarding request logical channel, the nodes in the reception waiting state determine that the message to be retransmitted has already been delivered through other nodes and cancel retransmission of the message.

Through the processes described above, the nodes within a network according to the present invention may minimize unnecessary retransmission of a message.

FIG. 14 is a flow diagram illustrating one example of a method for message flooding in a synchronized multi-hop based wireless network according to the present invention.

In other words, FIG. 14 illustrates a message flooding method by which a message generated at a source node in a synchronized, multi-hop based wireless network is delivered to the nodes within the whole network except for the source node.

As described above, each node in the corresponding network is connected to radio resources, being synchronized in the time and frequency domain with each other.

Also, the radio resource provides three logical transmission channels for message flooding, namely data logical channel, forwarding waiting logical channel, and forwarding request logical channel.

With reference to FIG. 14, a source node (or retransmission node) transmits a message through the data logical channel and listens to the forwarding request logical channel located next to the data logical channel S1410.

The listening to the forwarding request logical channel may be interpreted as a process for searching for a signal in the forwarding request logical channel.

Next, a node which has received the message transmitted from the data logical channel without an error transmits the ACK signal through the forwarding waiting logical channel located next to the data logical channel and listens to the forwarding request logical channel located next to the forwarding waiting logical channel S1420.

At this time, those nodes which have failed to receive the message from the data logical channel but has detected the ACK signal from the forwarding waiting logical channel located next to the data logical channel transmit a signal for requesting message retransmission through the forwarding request logical channel located next to the forwarding waiting logical channel.

In case a signal is detected from the forwarding request logical channel, the nodes corresponding to the S1410 and S1420 steps configures retransmission waiting time to be inversely proportional to the strength of the signal received from the forwarding request logical channel and listen continuously to the forwarding request logical channel until the configured retransmission waiting time is completed S1430.

If no signal is detected from the forwarding request logical channel before the retransmission waiting time of each node corresponding to the S1430 step, the nodes cancel message retransmission S1440.

However, in case a signal is detected from the forwarding request logical channel before the retransmission waiting time of each node corresponding to the S1430 step, the nodes retransmit a message through the data logical channel when the retransmission waiting time is completed S1450.

To summarize, different from existing message flooding methods described above, according to a message flooding method in a synchronized, multi-hop based wireless network according to the present invention, a source node, those nodes located (or existing) outside the transmission range of a node performing message retransmission, or those nodes which have caused an error during message interpretation explicitly request message retransmission through the forwarding request logical channel; therefore, the transmission range of message retransmission in the corresponding network may be maximized.

Moreover, according to a message flooding method of the present invention, even those nodes in the retransmission waiting state may cancel retransmission when a signal is not detected from the forwarding request logical channel, thereby minimizing the number of unnecessary retransmission.

Apparatus to which the Present Invention May be Applied

FIG. 15 illustrates one example of an internal block diagram of a wireless communication system to which method according to the present invention may be applied.

With reference to FIG. 15, a wireless communication system comprises an eNB 1510 and a plurality of UEs 1520 located within the communication range of the eNB 1510.

The eNB may refer to a transmitting node, node, or source node while the UE may refer to a receiving node, node, or neighboring node.

The eNB 1510 includes a processor 1511, a memory 1512, and an RF (Radio Frequency) unit 1513. The processor 1511 implements functions, processes and/or methods proposed in FIG. 1 to FIG. 14. The layers of a wireless interface protocol may be implemented by the processor 1511. The memory 1512 is connected to the processor 1511 and stores various information for driving the processor 1511. The RF unit 1513 is connected to the processor 1511 and transmits and/or receives radio signals.

The UE 1520 includes a processor 1521, a memory 1522, and an RF (Radio Frequency) unit 1523. The processor 1521 implements functions, processes and/or methods proposed in FIG. 1 to FIG. 14. The layers of a wireless interface protocol may be implemented by the processor 1521. The memory 1522 is connected to the processor 1521 and stores various information for driving the processor 1521. The RF unit 1523 is connected to the processor 1521 and transmits and/or receives radio signals.

The memory 1512, 1522 may be located inside or outside the processor 1511, 1521, and may be coupled to the processor 1511, 1521 by using various well-known means. Also, the eNB 1510 and/or UE 1520 may have a single or multiple antennas.

The embodiments described above are combinations of constituting elements and characteristics of the present invention in a predetermined manner. Each individual constituting element or characteristic has to be considered to be selective unless otherwise explicitly stated. Each individual constituting element or characteristic may be implemented so that it is not combined with other constituting elements or characteristics. Also, the embodiment of the present invention may be implemented by combining part of the constituting elements and/or characteristics. The order of operations described in the embodiments of the present invention may be changed. Part of the structure or characteristics of one embodiment may be included in a different embodiment or replaced with the corresponding structure or characteristics of the different embodiment. It is apparent that an embodiment may be constructed by combining those claims not explicitly referencing to each other within the technical scope of the present invention or included as a new claim by amendment after patent application.

The embodiments of the present invention may be implemented by various means, for example, hardware, firmware, software, or a combination thereof. In the case of hardware implementation, one embodiment of the present invention may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processor, controller, micro-controller, and micro-processor.

In the case of software implementation, one embodiment of the present invention may be implemented in the form of a module, procedure, or function which performs the function or operations described above. Software codes may be executed by a processor stored in the memory. The memory may be located inside or outside the processor and may exchange data with the processor by using already-known various means.

It should be clearly understood by those skilled in the art that the present invention may be embodied in a different specific form as long as the embodiment does not lose essential characteristics of the present invention. Therefore, the detailed descriptions above may not be interpreted as limiting the present invention in any aspects but should be regarded as being illustrative. The technical scope of the present invention should be determined according to rational interpretation of appended claims, and all changes within the equivalent scope of the present invention should be included in the technical scope of the present invention.

INDUSTRIAL APPLICABILITY

A message flooding method in a wireless communication system according to the present invention has been described with an example applied to the 3GPP LTE/LTE-A system, but the present invention may also be applied to various wireless communication systems in addition to the 3GPP LTE/LTE-A system.

What is claimed is:

1. A method for receiving a flooding message in a wireless communication system, the method comprising:

receiving, by a first receiving node from a transmitting node, the flooding message on a first common channel;

transmitting, by the first receiving node, an ACK signal on a second common channel or a NACK signal on a third common channel based on a reception result of the flooding message;

when the first receiving node transmits the NACK signal a predetermined number of times or when the first receiving node transmits the NACK signal with more energy than a predetermined value, stopping, by the first receiving node, a transmission of the NACK signal; and transmitting, by the first receiving node, a poll signal for requesting a retransmission of the flooding message on a fourth common channel, wherein the poll signal is transmitted when the first receiving node has not successfully received the flooding message on the first common channel, but has detected an ACK signal transmitted by a second receiving node on the second common channel.

2. The method of claim 1, wherein the first common channel, the second common channel, the third common channel and the fourth common channel are included in one radio frame and are repeated for each radio frame.

3. A first receiving node for receiving a flooding message in a wireless communication system, the first receiving node comprising:

a transmitter for transmitting a radio signal;

a receiver for receiving a radio signal; and a processor configured to control the transmitter and the receiver, wherein the processor is configured to:

receive, from a transmitting node, the flooding message on a first common channel;

transmit an ACK signal on a second common channel or a NACK signal on a third common channel based on a reception result of the flooding message;

when the NACK signal is transmitted a predetermined number of times or when the NACK signal is transmitted with more energy than a predetermined value, stop a transmission of the NACK signal; and transmit a poll signal for requesting a retransmission of the flooding message on a fourth common channel, wherein the poll signal is transmitted when the first receiving node has not successfully received the flooding message on the first common channel, but has detected an ACK signal transmitted by a second receiving node on the second common channel.

4. The method of claim 1, further comprising:

when the first receiving node detects the retransmission of the flooding message, stopping, by the first receiving node, a transmission of the poll signal.

* * * * *